(12) United States Patent
Gwag

(10) Patent No.: US 9,103,489 B2
(45) Date of Patent: Aug. 11, 2015

(54) TERMINAL STAND

(71) Applicant: Su Man Gwag, Seoul (KR)

(72) Inventor: Su Man Gwag, Seoul (KR)

(73) Assignee: ACE-HINGE TECH CO., LTD., Gyeonggi-Do (KR)

( * ) Notice: Subject to any disclaimer, the term of this patent is extended or adjusted under 35 U.S.C. 154(b) by 217 days.

(21) Appl. No.: 13/860,795

(22) Filed: Apr. 11, 2013

(65) Prior Publication Data

US 2014/0145051 A1    May 29, 2014

(30) Foreign Application Priority Data

Nov. 23, 2012  (KR) .................. 10-2012-0133627

(51) Int. Cl.
| | |
|---|---|
| *A47F 5/00* | (2006.01) |
| *F16M 13/02* | (2006.01) |
| *B60R 11/02* | (2006.01) |
| *F16M 11/04* | (2006.01) |
| *F16M 11/14* | (2006.01) |
| *F16M 11/20* | (2006.01) |
| *F16M 13/00* | (2006.01) |
| *B60R 21/055* | (2006.01) |
| *B60R 11/00* | (2006.01) |

(52) U.S. Cl.
CPC .............. *F16M 13/022* (2013.01); *B60R 11/02* (2013.01); *B60R 21/055* (2013.01); *F16M 11/041* (2013.01); *F16M 11/14* (2013.01); *F16M 11/2064* (2013.01); *F16M 11/2092* (2013.01); *F16M 13/00* (2013.01); *B60R 2011/0089* (2013.01); *F16M 2200/024* (2013.01); *F16M 2200/028* (2013.01)

(58) Field of Classification Search
CPC .............. F16M 13/02; F16M 2200/06; F16M 2200/065
USPC .......... 248/298.1, 274.1, 276.1, 284.1, 285.1, 248/287.1, 309.1, 326, 333, 125.8
See application file for complete search history.

(56) References Cited

U.S. PATENT DOCUMENTS

| | | | |
|---|---|---|---|
| 6,857,610 B1 * | 2/2005 | Conner et al. ............. | 248/284.1 |
| 8,317,152 B1 * | 11/2012 | Zhou .............................. | 248/596 |
| 8,696,057 B2 * | 4/2014 | Wang ....................... | 297/188.06 |
| 2012/0168581 A1 * | 7/2012 | Cheng et al. ............... | 248/206.2 |

* cited by examiner

*Primary Examiner* — Todd M Epps
(74) *Attorney, Agent, or Firm* — AKC Patents LLC; Aliki K. Collins

(57) ABSTRACT

The present invention relates to a terminal stand, and includes a stand attaching part; a terminal standing part; a plurality of arms connected between the stand attaching part and the terminal standing part, and configured to move to a different direction mutually; and an arm connecting part coupled to a first arm and a second arm adjacent to each other among the plurality of arms, and configured to allow the first arm and the second arm to be arranged in an overlapping manner along a lengthwise direction of the first arm and the second arm or to allow the first arm and the second arm to be swiveled.

3 Claims, 9 Drawing Sheets

TERMINAL STAND

CROSS-REFERENCE TO RELATED APPLICATION

This application claims the benefit of Korean Patent Application No. 10-2012-0133627, filed on Nov. 23, 2012 in the Korean Intellectual Property Office, the disclosure of which is incorporated herein by reference.

TECHNICAL FIELD

The present invention relates to a terminal stand, and more particularly, to a terminal stand, a terminal standing part of which is moved rearward or swiveled when a body of a user collides with a terminal standing on the terminal standing part, and reduces an injury occurring due to a collision with a terminal.

BACKGROUND ART

Portable terminals such as a navigation, a portable media player PMP, a personal digital assistants PDA, a digital multimedia broadcasting (DMB) player, a MPEG audio layer-3 (MP3) player, a smart phone, or the like are electric devices which are made smaller such that a user carries the electric devices or mounts the electric devices in a car to use them.

Recently, with the development of technology, a portable terminal provides various functions such as a reproduction of a music and a video, a game, a camera, a schedule management, a dictionary, or the like as well as an original function of the portable terminal, and also provides a function of searching various information and a function of adding a new application, so as to satisfy user's various demands.

When the portable terminal is used in a car, a terminal stand is used.

A terminal stand, as disclosed in Korea Patent Application Number 10-2010-0128409, or the like, is attached to a dashboard or a glass surface provided inside a car to be used.

However, in the case of a terminal stand generally used currently, the terminal stand is generally installed such that a terminal protrudes toward a passenger. Therefore, when a momentary strong impact, such as an operation of braking sharply and a collision, occurs during driving of a car, a passenger collides with a terminal standing on the terminal stand to be seriously injured, and thus, a proper alternative is needed.

PATENT DOCUMENTATION

Korea Patent Application Number 10-2010-0128409

DISCLOSURE OF INVENTION

Accordingly, the present invention is directed to provide a terminal stand, which substantially obviates one or more problems due to limitations and disadvantages of the related art. An aspect of the present invention is directed to provide a terminal stand, a terminal standing part of which is moved rearward or swiveled when a body of a user collides with a terminal standing on the terminal standing part, and reduces an injury occurring due to a collision with a terminal.

To achieve these and other advantage and in accordance with the purpose of the invention, as embodied and broadly described herein, there is provided a terminal stand, which includes: a stand attaching part; a terminal standing part; a plurality of arms connected between the stand attaching part and the terminal standing part, and configured to move to a different direction mutually; and an arm connecting part coupled to a first arm and a second arm adjacent to each other among the plurality of arms, and configured to allow the first arm and the second arm to be arranged in an overlapping manner along a lengthwise direction of the first arm and the second arm or to allow the first arm and the second arm to be swiveled.

Here, the arm connecting part includes a plurality of wave protrusions formed in the first arm along a lengthwise direction of the first arm; a sliding block configured to comprise one or more legs selectively hung on the plurality of wave protrusions, and coupled to the first arm such that the sliding block slidably moves along a lengthwise direction of the first arm; a housing block fixed to the second arm to operate together with the second arm, and configured with a plurality of wave-shaped grooving parts formed in the housing block along a round-shaped inner circumference surface; and a swivel stopper configured to comprise one or more wings selectively hung on the plurality of wave-shaped grooving parts, and coupled to the sliding block.

A sliding groove, into which a slider of the sliding block is partially inserted to slide, may be formed in the first arm.

The plurality of wave protrusions may be disposed inside both walls of the first arm, and the legs may be arranged in the sliding block such that the leg faces the plurality of wave protrusions.

ADVANTAGEOUS EFFECTS

According to embodiments of the present invention, when a body of a user collides with a terminal standing on the terminal standing part, a terminal standing part is moved toward a stand attaching part or swiveled, and thus, an injury occurring due to a collision with a terminal may be reduced.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

MODES FOR CARRYING OUT THE INVENTION

Hereinafter, embodiments of the present invention will be described in detail with reference to the accompanying drawings.

Hereinafter, a terminal stand installed in a car to be used is described as an embodiment of the terminal stand according to the present invention. Moreover, the terminal stand according to the present invention may be attached to a dashboard or a glass surface provided inside a car to be used, and also may be attached to a structure such as a desk, a wall or the like to be used.

Figure 1:
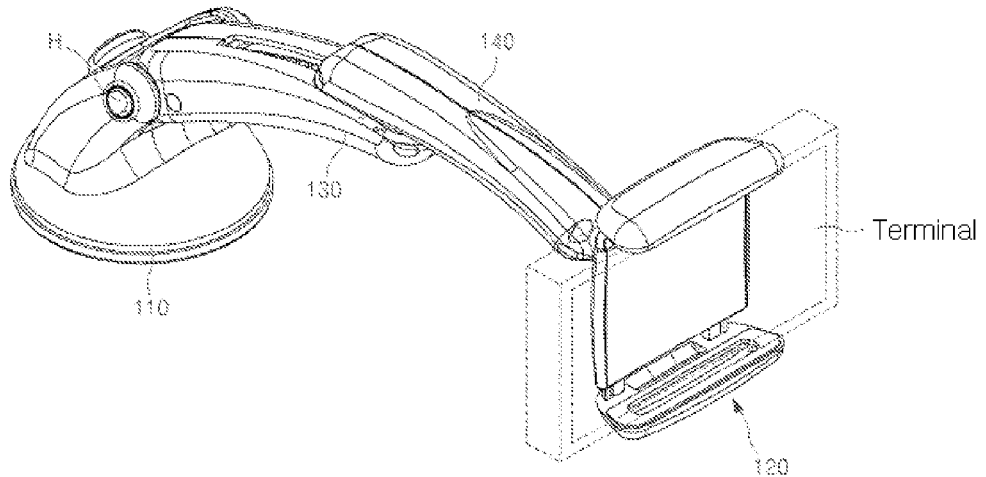
FIG. 1 is a perspective view illustrating a terminal stand according to an embodiment of the present invention.
Figure 2:
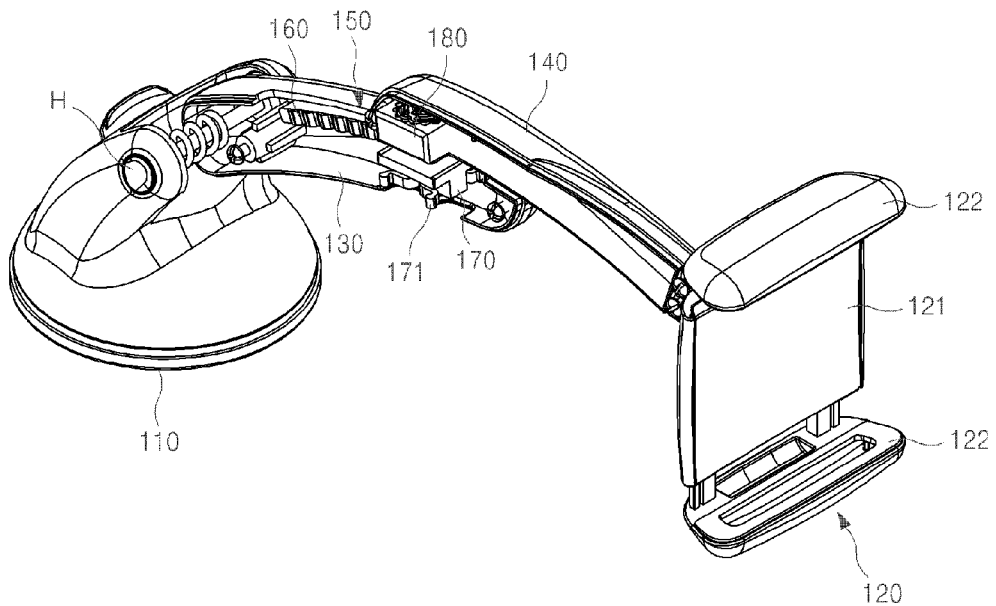
FIG. 2 is a partially cut perspective view of FIG. 1.
Figure 3:
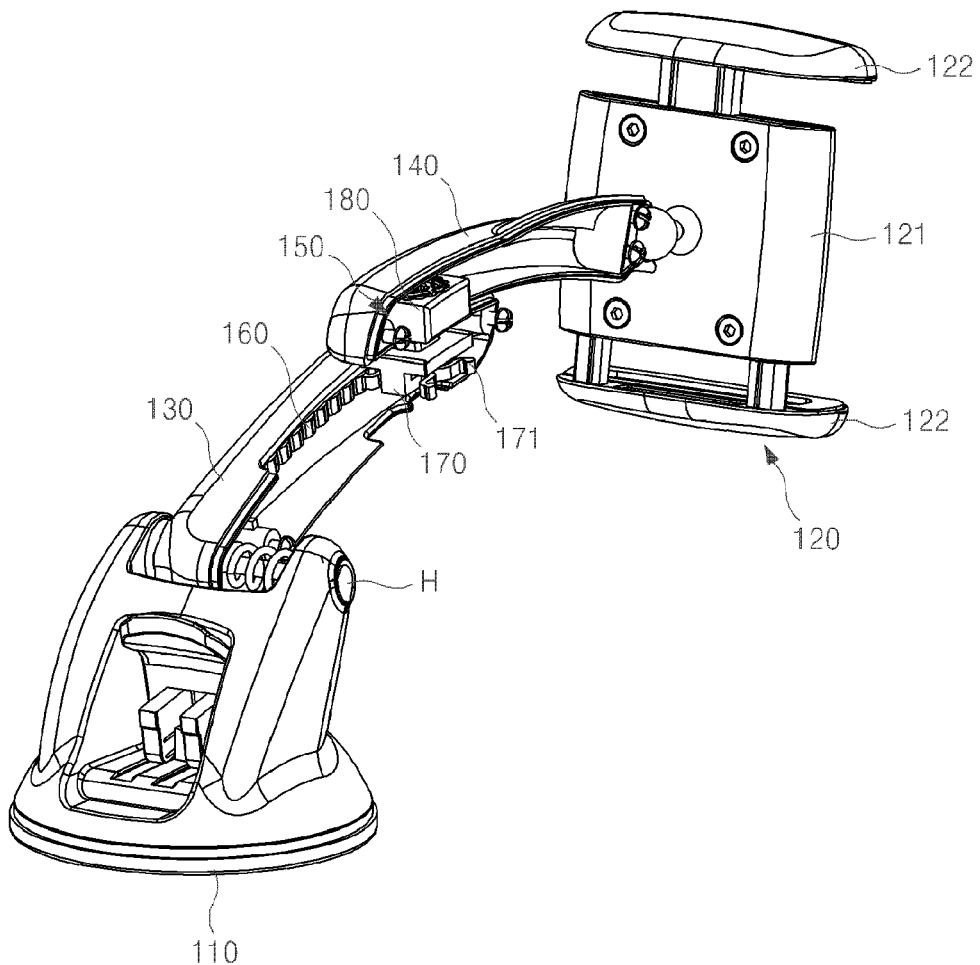
FIG. 3 is an exemplary view illustrating the terminal stand of FIG. 2 in different angle.
Figure 4:
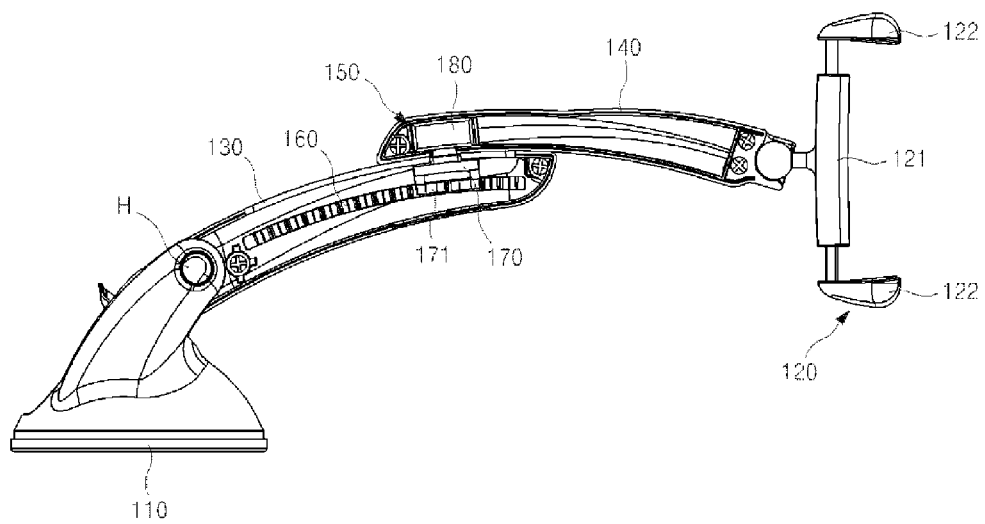
FIG. 4 is a side view of FIG. 2.
Figure 5:
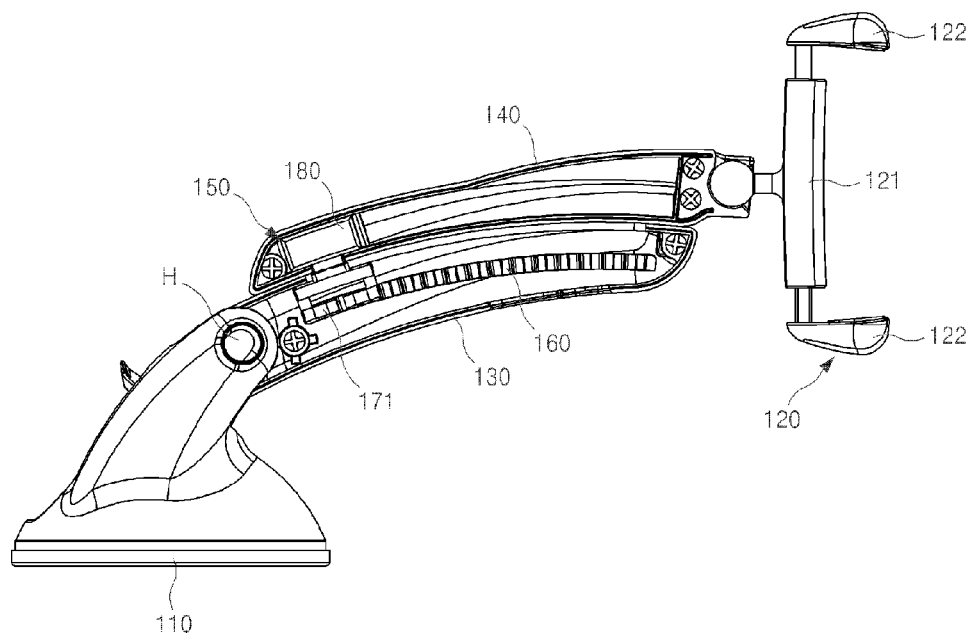
FIGS. 5 and 6 are exemplary diagrams illustrating a changed state of the terminal stand when a strong impact is applied to the terminal stand shown in FIG. 1.
Figure 6:
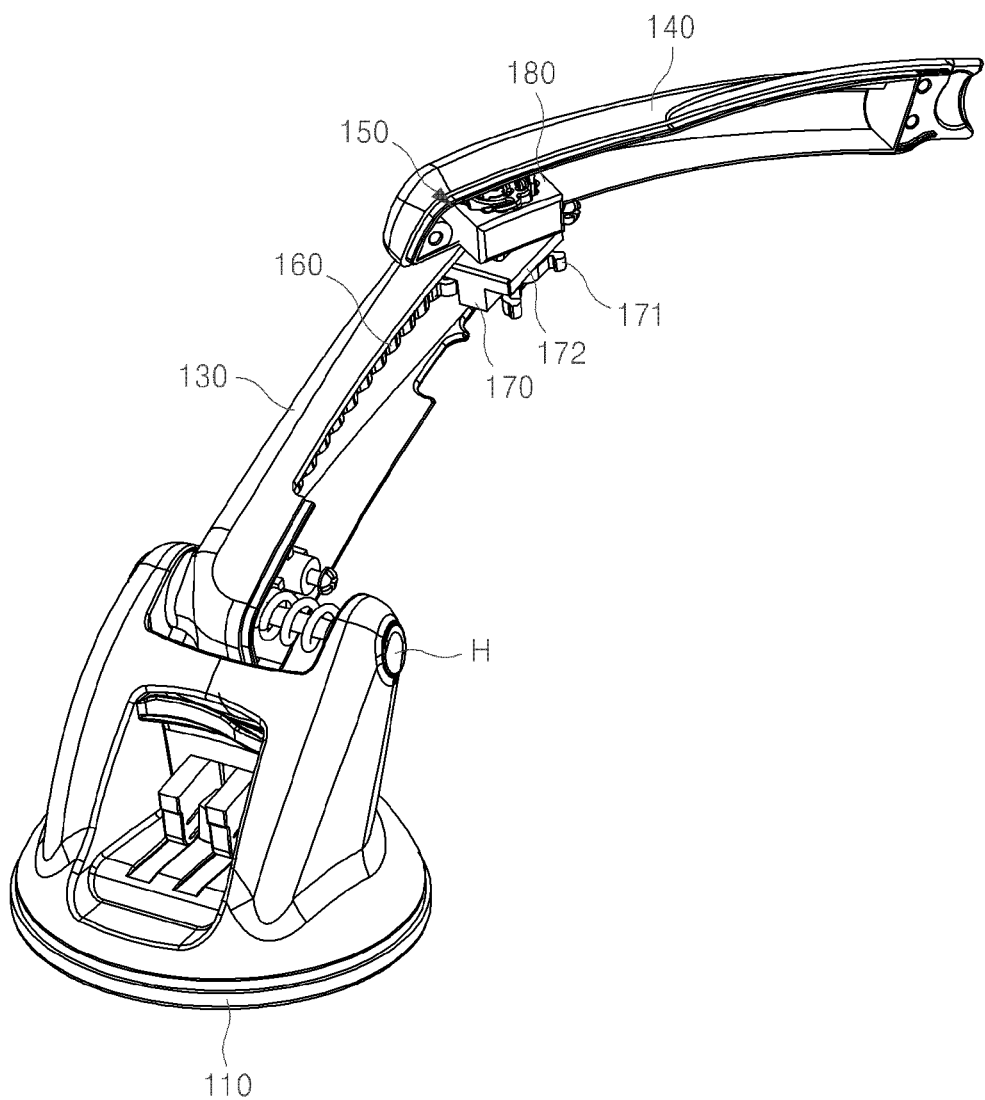
Figure 7:
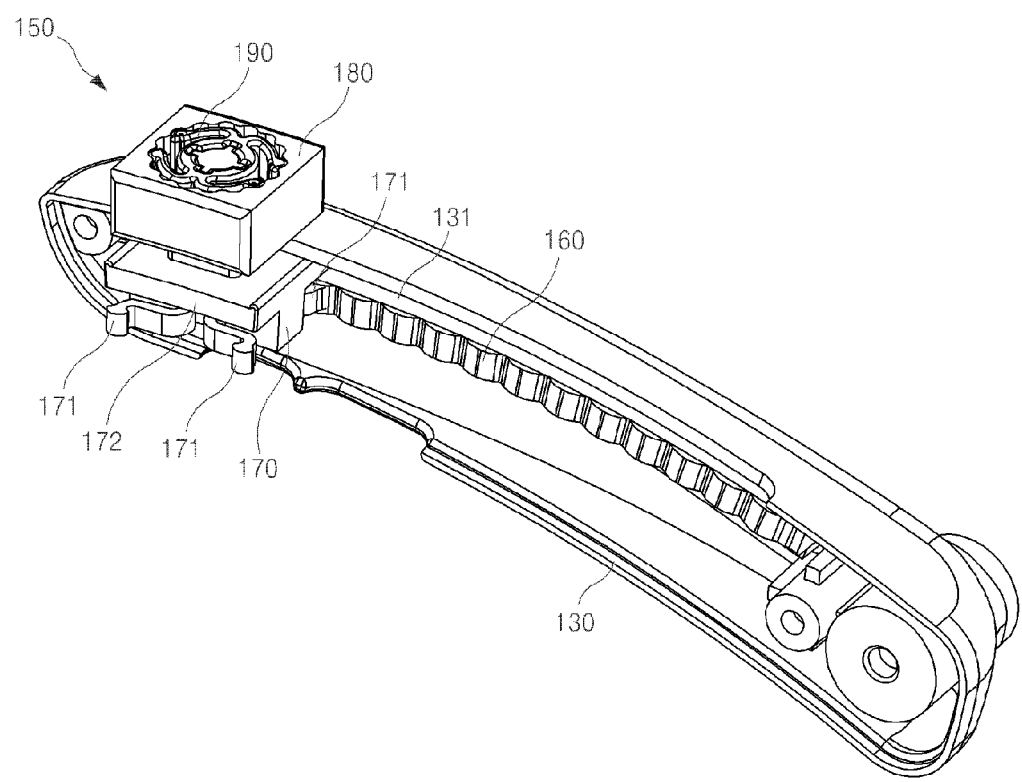
FIG. 7 is a partial enlarged view of FIG. 2 for describing an arm connecting part.
Figure 8:
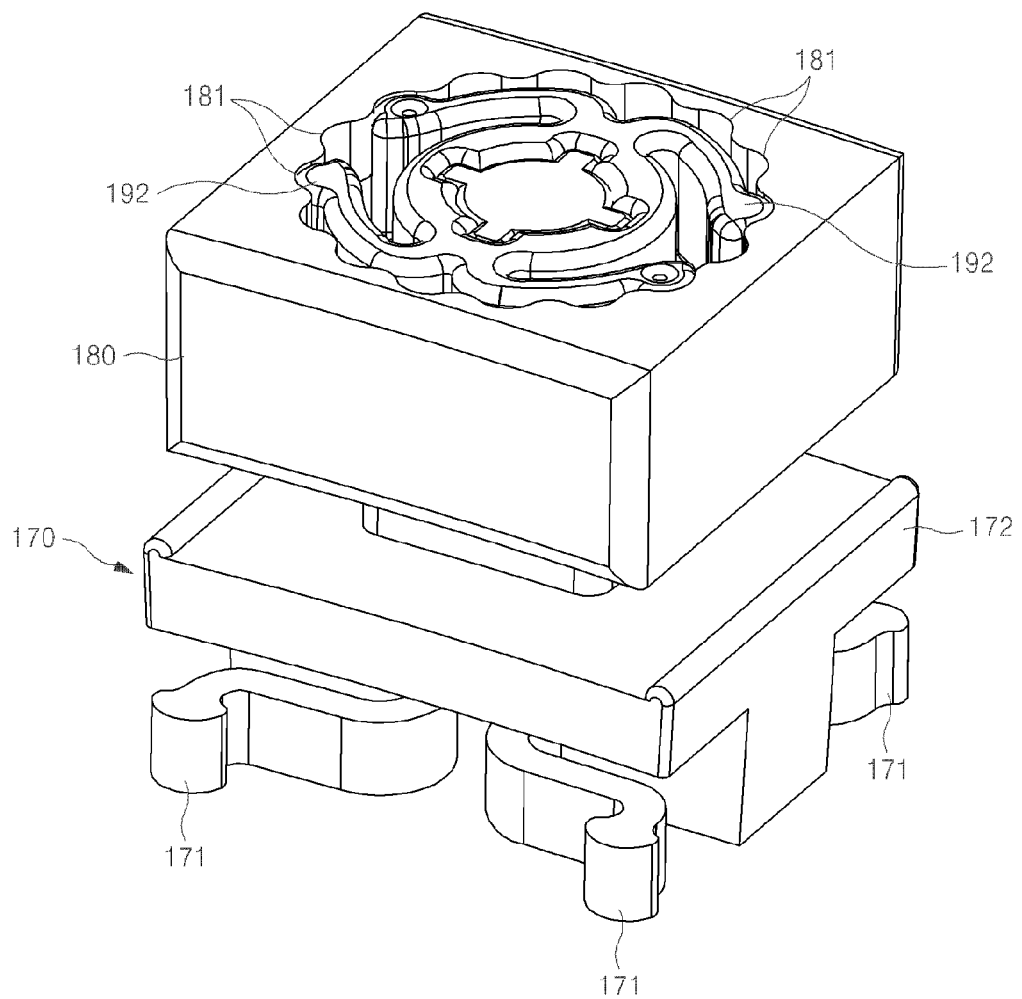
FIG. 8 is an enlarged view of FIG. 7.
Figure 9:
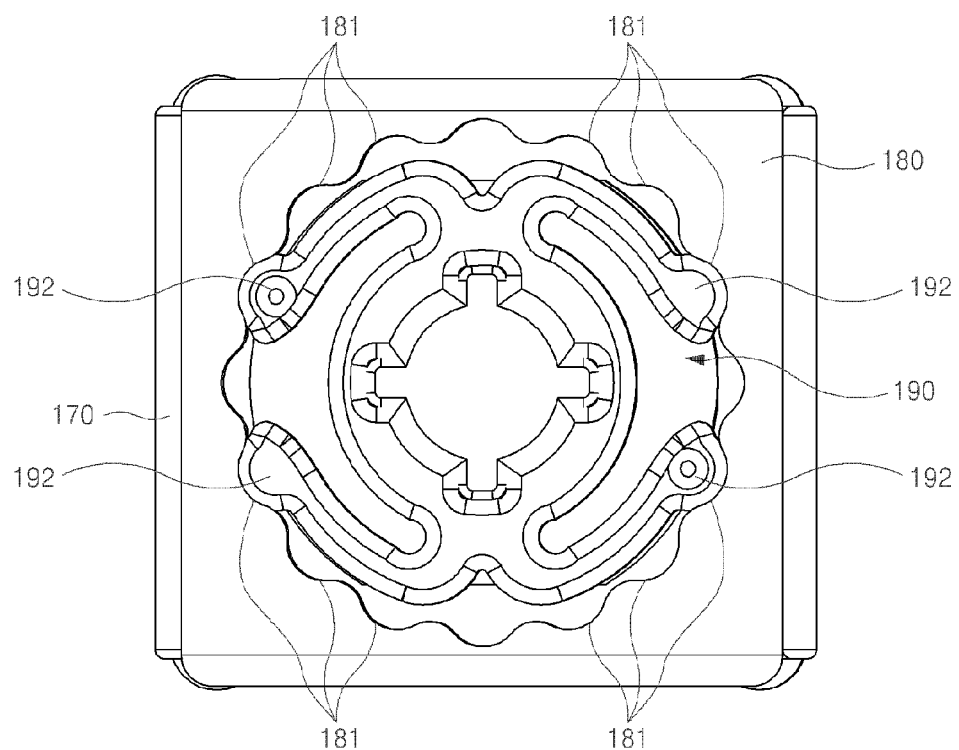
FIG. 9 is a plan view of FIG. 8.
Figure 10:
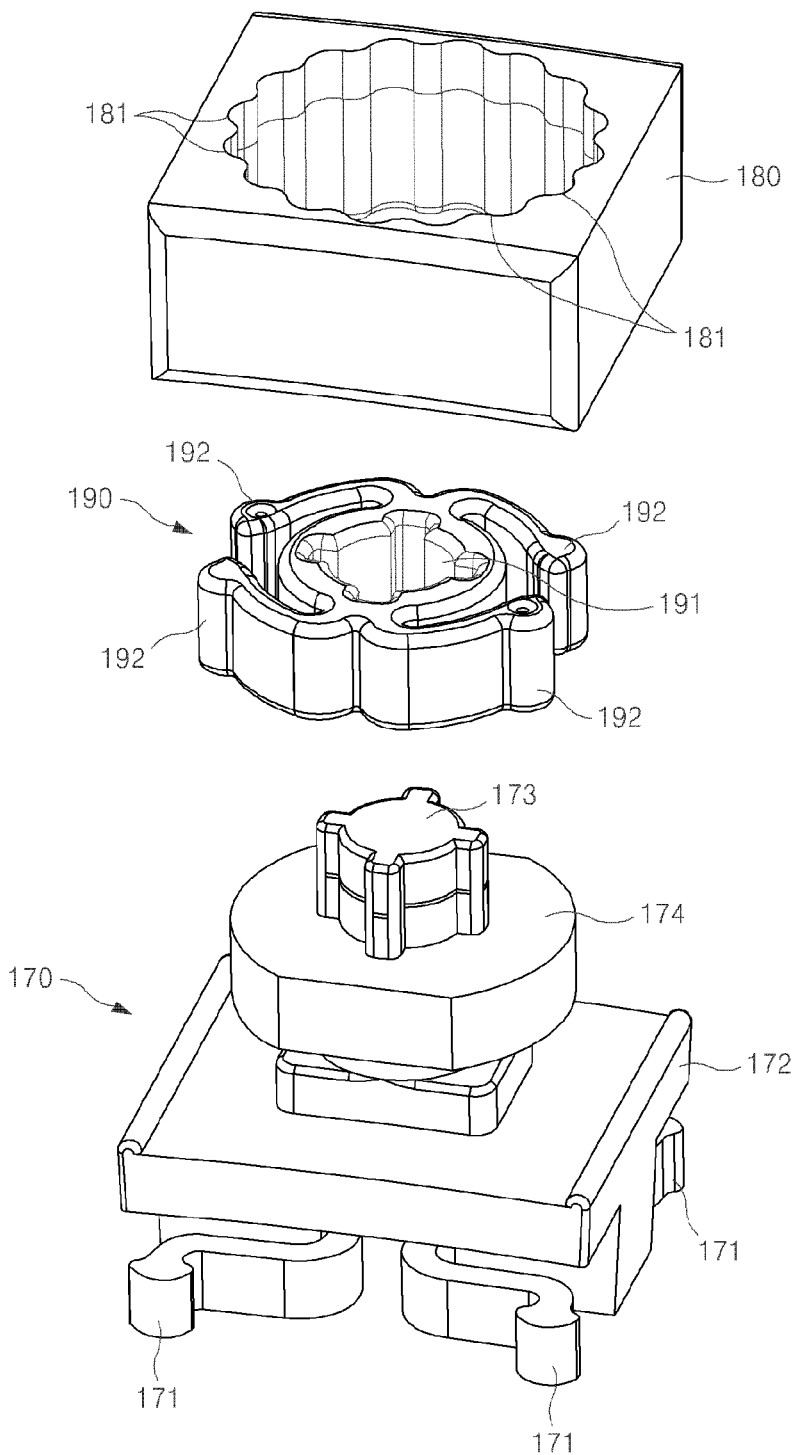
FIG. 10 is an exploded perspective view of FIG. 8.

FIG. 1 is a perspective view illustrating a terminal stand according to an embodiment of the present invention, FIG. 2 is a partially cut perspective view of FIG. 1, FIG. 3 is an exemplary view illustrating the terminal stand of FIG. 2 in different angle, FIG. 4 is a side view of FIG. 2, FIGS. 5 and 6 are exemplary diagrams illustrating a changed state of the terminal stand when a strong impact is applied to the terminal stand shown in FIG. 1, FIG. 7 is a partial enlarged view of FIG. 2 for describing an arm connecting part, FIG. 8 is an enlarged view of FIG. 7, FIG. 9 is a plan view of FIG. 8 and FIG. 10 is an exploded perspective view of FIG. 8.

Referring to these drawings, it is general that the terminal stand according to an embodiment of the present invention is installed so as to stand a terminal in a car. However, unlike a related art terminal stand, in the terminal stand according to the embodiment, a length of a protruded position of a terminal standing part 120 can be decreased or an angle of protruded position of a terminal standing part 120 can be swiveled as shown in FIGS. 5 and 6 from a normal state shown in FIG. 1, when a momentary strong impact, such as an operation of braking sharply, occurs during driving of a car. Thus, an injury occurring to a passenger colliding with a terminal can be reduced.

The terminal stand according to the embodiment of the present invention for improving the above-described effect includes a stand attaching part 110, a terminal standing part 120, a plurality of arms 130 and 140, and an arm connecting part 150.

The stand attaching part 110 is a portion which can be attached or detached to an installation surface provided inside a car. In the embodiment of the present invention, the stand attaching part 110 is operated by using a vacuum suction method.

The stand attaching part 110 can be attached to a dashboard or a glass surface provided inside a car to be used.

Here, the stand attaching part 110 using the vacuum suction method is only an example, and thus the present invention is not limited thereto. For example, a magnet can be used.

The terminal standing part 120, as shown in FIG. 1, is a place on which a terminal is stood. Every types of terminals, such as a navigation, a portable media player PMP, a personal digital assistants PDA, a digital multimedia broadcasting (DMB) player, a MPEG audio layer-3 (MP3) player, a smart phone, or the like can be used as a terminal.

In the embodiment of the present invention, a terminal standing part 120 includes a pair of terminal holders 122 which supports a terminal. That is, each of the pair of terminal holders 122 disposed in both sides of a standing surface 121 can be elastically moved to a direction to which a gap between the pair of terminal holders 122 progressively narrows mutually. Therefore, if a user broadens a gap between the pair of terminal holders 122, disposes a terminal in the gap, and then releases the pair of terminal holders 122, the pair of terminal holders 122 can elastically approach each other to pick up the terminal to fix it.

Here, the terminal standing part 120 is only an example, and thus the present invention is not limited thereto. For example, a magnet can be used.

A plurality of arms 130 and 140 are connected between a stand attaching part 110 and a terminal standing part 120, and can move to a different direction mutually. The terminal standing part 120 can protrude a little more toward a driver to be adjacent to a driver by using the arms 130 and 140.

In the case of the embodiment of the present invention, for convenience of a description, two arms, for example, a first arm 130 and a second arm 140 are shown in drawings, but the number of the arms may be equal to or more than three.

The first arm 130 is connected to the stand attaching part 110 by a hinge H. Therefore, a tilting angle of the first arm 130 can be easily adjusted with respect to the stand attaching part 110. Here, a general step hinge may be used as the hinge H.

The arm connecting part 150 is coupled to the first arm 130 and the second arm 140. Moreover, the arm connecting part 150 connects the first arm 130 and the second arm 140 to each other such that the first arm 130 and the second arm, which are in a normal state as shown in FIG. 1, are arranged in an overlapping manner along a lengthwise direction of each of the arms 130 and 140 as shown in FIG. 5, or are swiveled relative to each other as shown in FIG. 6, depending on impact occurring due to external force.

In particular, the arm connecting part 150 allows the first arm 130 and the second 140, which are in a normal state as shown in FIG. 1, to be arranged in an overlapping manner along a lengthwise direction of each of the arms 130 and 140 as shown in FIG. 5, or to be swiveled relative to each other as shown in FIG. 6, without consuming fuel. Therefore, an injury occurring to a passenger colliding with a terminal protruding forward can be reduced.

The arm connecting part 150 includes, as shown in FIGS. 7 to 10, a plurality of wave protrusions 160, a sliding block 170 coupled to the first arm 130 so as to slidably move along a lengthwise direction of the first arm 130, a housing block 180 fixed to the second arm 140 to move with the second arm 140, and a swivel stopper 190 coupled to the sliding block 170.

An end portion of each of the plurality of wave protrusions 160 has a certain radius of curvature, the plurality of wave protrusions 160 are formed in a continuous wave shape, and are disposed inside both walls of the first arm 130. The plurality of wave protrusions 160 are disposed in every region of the first arm 130 along a lengthwise direction of the first arm 130.

The sliding block 170 includes a leg 171 which is selectively hung on the plurality of wave protrusions 160.

The legs 171 are arranged in both sides of a lower portion of the sliding block 170 so as to face the plurality of wave protrusions 160 and to be symmetrical with each other. The leg has elasticity such that the leg 171 is smoothly hung on the wave protrusion 160, and at the same time, has a cantilever shape which is smoothly bent to a wave shape. Also, an end portion of the leg 171 is formed in a round shape. In the embodiment of the present invention, four legs 171 are shown in drawings, but the number of the leg 171 is not limited thereto, and thus, one or more legs 171 can be provided.

Therefore, an extended length or shorten length of the second arm 140 with respect to the first arm 130 can be adjusted by selectively hanging the leg 171 on the plurality of wave protrusion 160 to maintain the leg 171, and thus, a position of the terminal standing part 120 can be adjusted to a desired position. Moreover, as the leg 171 is hung on the wave protrusion 160 to be maintained, a movement of the second arm 140 toward the first arm 130 can be prevented in normal time. Here, the movement occurs due to a vibration of a car.

However, when a body of a passenger in a car collides with a terminal standing part 120 due to a momentary strong impact, such as an operation of braking sharply and a collision, the leg 171 may be pushed toward the stand attaching part 110 along the wave protrusion 160 to move.

The sliding block 170 includes a slider 172. The slider 172 is partially inserted into a sliding groove 131 of the first arm 130 (referring to FIG. 7) to guide a movement of the leg 171 moving along the wave protrusion 160.

A housing block 180 is a portion which is fixed to the second arm 140. Therefore, the housing block 180 is operated together with the second arm 140. A plurality of wave-shaped grooving parts 181 are formed like a flower shape in the housing block 180 along a round-shaped inner circumference surface.

The swivel stopper 190 relatively rotates with respect to the housing block 180. For this end, as shown in FIG. 10, four wings 192, which are disposed at an equal-angle distance to be selectively hung on the wave-shaped grooving part 181 of the housing block 180, are formed in an outer circumference surface of the swivel stopper 190. In the embodiment of the present invention, four wings 192 are shown in drawings, but the number of the wing 192 is not limited thereto, and thus, one or more wings 192 can be provided.

Each of the wings 192 has elasticity such that the wing 192 is smoothly hung on the wave-shaped grooving part 181, and at the same time, has a cantilever shape. Also, an end portion of each of the wings 192 is formed in a semicircular shape corresponding to the wave-shaped grooving part 181, and is hung on the wave-shaped grooving part 181 of the housing block 180.

Moreover, the wings 192 of the swivel stopper 190 also performs a swivel-angle adjusting function during adjusting a position of a terminal in the initial stages. That is, when a user takes a terminal to turn the terminal to a position in which a user can conveniently see the terminal, the second arm 140 is swiveled with respect to the first arm 130. In this case, the wings 192 moves backward and forward along the wave-shaped grooving part 181 of the housing block 180 to contribute to an adjustment of a swivel angle of the terminal. After the swivel angle of the terminal is adjusted, the wings 192 are positioned in the wave-shaped grooving part 181, and thus, a relative rotation between the wings and the wave-shaped grooving part is blocked.

However, when a momentary strong impact, such as an operation of braking sharply and a collision, occurs during driving of a car, the wings 192 of the swivel stopper 190 moves backward and forward along the wave-shaped grooving part 181 of the housing block 180, and thus, the swivel stopper 190 can relatively rotate with respect to the housing block 180. That is, the first arm 130 and the second arm 140 mutually swivel.

The swivel stopper 190 is connected such that the swivel stopper 190 does not idly rotate with respect to the sliding block 170. For this end, a non-circular hole 191 is formed in the swivel stopper 190, and a non-circular protrusion part 173, which is matched to the non-circular hole 191 to be coupled to the non-circular hole 191, is formed in an upper portion of the sliding block 170.

As shown in FIG. 10, because the non-circular hole 191 of the swivel stopper 190 is inserted into the non-circular protrusion part 173 of the sliding block 170, the swivel stopper 190 and the sliding block 170 do not idly rotate with each other.

The sliding block 170 further includes a dummy part 174 which is disposed between the slider 172 and the non-circular protrusion part 173. The dummy part 174 is a structure for height compensation between the first arm 130 and the second arm 140.

An operation of the terminal stand configured with the above-described components will be described below.

In normal time, as shown in FIG. 1, the terminal stand is mounted on a car to be used. As shown in FIG. 1, it is general that the terminal is mounted so as to protrude toward a driver to some degree, so a driver can secure a clear view for driving and can watch the terminal.

In a car in the state, if a momentary strong impact, such as an operation of braking sharply and a collision, occurs, a body of a passenger collides with a terminal to press the terminal. In this case, the terminal receives force swiveling the terminal as well as force pressing the terminal backward, at the same time.

First, if the terminal receives force pressing the terminal backward, the second arm 140 connected to the terminal standing part 120 is pressed toward the first arm 130. In this case, the leg 171 is pushed backward along the wave protrusion 160 due to characteristics of a structure of the leg 171.

Therefore, as shown in FIG. 5, the first arm 130 and the second arm 140 are naturally arranged in an overlapping manner, and thus, a total length of the first arm 130 and the second arm 140 is shorten. Thus, a protrusion position of the terminal standing part 120 is positioned in the back side of an initial position as shown in FIG. 1.

Next, if the terminal receives force in a direction, in which the terminal is swiveled, due to a strong impact applied to the terminal, the second arm 140 connected to the terminal is also swiveled. In this case, the wings 192 of the swivel stopper 190 moves backward and forward along the wave-shaped grooving part 181 of the housing block 180 due to characteristics of a structure of the swivel stopper 190, and thus, the second arm 140 is swiveled with respect to the first arm 130.

Consequentially, if a strong impact is applied, the terminal receives force swiveling the terminal as well as force pressing the terminal backward, at the same time, and thus, the first arm 130 and the second arm 140, which are in a normal state as shown in FIG. 1, are arranged in an overlapping manner as shown in FIG. 5, or the second arm 140 is swiveled with respect to the first arm 130 as shown in FIG. 6. That is, the terminal standing part 120 may move toward the stand attaching part 110 or may be swiveled.

According to the present invention described above, when a body of a user collides with a terminal standing on the terminal standing part 120, the terminal standing part 120 moves toward the stand attaching part 110 or is swiveled, and thus, an injury occurring due to a collision with a terminal can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

| Descriptions of reference numbers | |
|---|---|
| 110: stand attaching part | 120: terminal standing part |
| 130: first arm | 131: sliding groove |
| 140: second arm | 150: arm connecting part |
| 160: wave protrusion | 170: sliding block |
| 171: leg | 172: slider |
| 173: non-circular protrusion part | 174: dummy part |
| 180: housing block | 181: wave-shaped grooving part |
| 190: swivel stopper | 191: non-circular hole |

The invention claimed is:
1. A terminal stand comprising:
a stand attaching part;
a terminal standing part;

a first arm and a second arm connected between the stand attaching part and the terminal standing part, and configured to move to a different direction mutually; and an arm connecting part coupled to the first arm and the second arm and configured to allow the first arm and the second arm to be arranged in an overlapping manner along a lengthwise direction of the first arm and the second arm or to allow the first arm and the second arm to be swiveled;

wherein, the arm connecting part comprises:

a plurality of wave protrusions formed in the first arm along a lengthwise direction of the first arm;

a sliding block configured to comprise one or more legs selectively hung on the plurality of wave protrusions, and coupled to the first arm such that the sliding block slidably moves along a lengthwise direction of the first arm;

a housing block fixed to the second arm to operate together with the second arm, and configured with a plurality of wave-shape grooving parts formed in the housing block along a round-shaped inner circumference surface; and a swivel stopper configured to comprise one or more wings selectively hung on the plurality of wave-shaped grooving parts, and coupled to the sliding block.

2. The terminal stand of claim 1, wherein, a sliding groove, into which a slider of the sliding block is partially inserted to slide, is formed in the first arm.

3. The terminal stand of claim 1, wherein, the plurality of wave protrusions are disposed inside both walls of the first arm, and the legs are arranged in the sliding block such that the leg faces the plurality of wave protrusions.

* * * * *